United States Patent
Vacek et al.

(10) Patent No.: US 11,475,529 B2
(45) Date of Patent: Oct. 18, 2022

(54) SYSTEMS AND METHODS FOR IDENTIFYING AND LINKING EVENTS IN STRUCTURED PROCEEDINGS

(71) Applicant: Thomson Reuters Enterprise Centre GmbH, Zug (CH)

(72) Inventors: Thomas Vacek, Minneapolis, MN (US); Hugo Molina-Salgado, Eagan, MN (US); Don Teo, Markham (CA); Frank Schilder, St. Paul, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 698 days.

(21) Appl. No.: 16/446,432

(22) Filed: Jun. 19, 2019

(65) Prior Publication Data

US 2019/0385254 A1   Dec. 19, 2019

Related U.S. Application Data

(60) Provisional application No. 62/686,852, filed on Jun. 19, 2018.

(51) Int. Cl.
  *G06Q 50/18* (2012.01)
  *G06N 20/00* (2019.01)
  *G06F 16/33* (2019.01)

(52) U.S. Cl.
  CPC ......... *G06Q 50/18* (2013.01); *G06F 16/3346* (2019.01); *G06N 20/00* (2019.01)

(58) Field of Classification Search
  CPC ..... G06Q 50/18; G06N 20/00; G06F 16/3346
  See application file for complete search history.

(56) References Cited

U.S. PATENT DOCUMENTS

| | | |
|---|---|---|
| 9,579,397 B1 | 2/2017 | Towell et al. |
| 2005/0240861 A1 | 10/2005 | Upchurch et al. |
| 2011/0107203 A1 | 5/2011 | Nash et al. |
| 2012/0317042 A1 | 12/2012 | Rhoads et al. |

OTHER PUBLICATIONS

Maryland Case Search, Mar. 2, 2018, https://web.archive.org/web/20180302173934/https://www.mdcourts.gov/casesearch2/faq (Year: 2018).*

(Continued)

*Primary Examiner* — Aryan E Weisenfeld
(74) *Attorney, Agent, or Firm* — Norton Rose Fulbright US LLP

(57) ABSTRACT

The present disclosure relates to systems and methods for analyzing and extracting docket data related to a structured proceeding, for identifying docket entries associated with motions and docket entries associated with orders, and for identifying motions affected by orders. Embodiments provide for receiving docket data associated with a structured proceeding, the docket data including at least one docket entry. Embodiments also include identifying, by an automated analysis, docket entries associated with motions in the structured proceeding, and docket entries associated with orders in the structured proceeding. In embodiments, identifying the docket entries associated with orders includes identifying at least one order that includes a results-affecting decision affecting at least one motion. Embodiments further include linking, by the automated analysis, the affected at least one motion to the affecting order.

15 Claims, 7 Drawing Sheets

(56) References Cited

OTHER PUBLICATIONS

Tutorial on Probabilistic Context-Free Grammers, https://courses.cs.washington.edu/courses/cse590a/09wi/pcfg.pdf (Year: 2009).*

International Search Report and Written Opinion issued for PCT Application No. PCT/US2019/037969, dated Sep. 9, 2019; 12 pages.

European Patent Office, Communication, Extended European Search Report issued for European Patent Application No. 19822303.4, dated Jun. 15, 2022, 7 pages.

* cited by examiner

SYSTEMS AND METHODS FOR IDENTIFYING AND LINKING EVENTS IN STRUCTURED PROCEEDINGS

CROSS-REFERENCE TO RELATED APPLICATION

The present application claims priority to U.S. Provisional Application No. 62/686,852, filed Jun. 19, 2018, and entitled, "SYSTEMS AND METHODS FOR DOCKET PARSING," the disclosure of which is incorporated by reference herein in its entirety.

TECHNICAL FIELD

The present subject matter is directed generally to data parsing, and more particularly to identifying and linking docket events within a structured proceeding.

BACKGROUND

Information about structured proceedings may not always be readily available. In many cases, although data related to the structured proceedings may be available, the information provided by the data may not be easily found. For example, in docket management systems, information about docket events, such as motions, decisions, orders, etc., may be hidden in the data, and may not be readily accessible to users, perhaps because the data is not explicit or clear as to the information. In one particular example, a motion may have been filed in a court proceeding, and a respective order may have been issued deciding on the motion. The docket data, however, may not be clear that the order is deciding on the motion, e.g., because the docket entry for the order may not explicitly cite or identify the motion. In this case, a user may have to sift through the data manually, and may have to interpret the data in order to find the motion or motions affected by the order. This manual processor for tying orders and motions is not only time consuming, but also error-prone.

SUMMARY

The present application relates to systems and methods for analyzing and extracting docket data related to a structured proceeding, for identifying, based on the analysis, docket entries associated with motions and docket entries associated with orders, for determining motions that are affected by results-affecting decisions in the orders, and for linking the affected motions to the affecting orders. For example, systems implemented in accordance with the present disclosure may provide mechanisms for identifying and linking orders with the respective motion or motions affected by the orders.

It is noted that as used herein, a "structured proceeding" may refer to any proceeding, proceedings, events, and/or series of events or activities that follow particular procedure. For example, a structured proceeding may include a court proceeding in a case. In this instance, the court proceeding may follow a formal procedure, with various actions and events (e.g., motions, hearings, filings, decisions, orders, etc.) associated with the case and involving at least one party (e.g., plaintiff, defendant, co-defendant, etc.), with at least decision maker (e.g., a judge). The events and materials associated with a court proceeding may be included in a docket, which may include docket entries associated with the various events. Although the discussion that follows focuses on a court proceeding and a docket of the court proceeding, the features and functionality discussed herein are also applicable to implementations involving other types of structured proceedings, e.g., project management, mergers and acquisitions, etc. As such, the functionality discussed herein may be applied to systems utilized to identify and link orders with affected motions for any series of events based on information associated with the proceedings. Therefore, the discussion that follows with respect to court dockets and associated docket entries should not be construed as limiting in any way.

In aspects, docket data may include docket entries with information related to the structured proceeding. During a structured proceeding, a motion or motions may be filed by a filing party (herein also referred to as a filer) asking the decision maker to decide on a particular issue. For example, during a court proceeding, a party may file a motion (e.g., a motion to dismiss, a motion for summary judgment, a motion for directed benefit, a motion for judgment notwithstanding the judgment, a motion in limine, a motion for change of venue, etc.) asking the decision maker (e.g., the judge) to make a decision with respect to the motion. The decision maker may issue an order that may include a results-affecting decision. As used herein, a results-affecting decision may refer to a decision including results that affect the structured proceeding, such as by making a decision on the request in the motion. As such, an order may affect a particular motion, as the order may be issued in response to the motion. As used herein, an affecting order may be an order including results-affecting decisions affecting at least one affected motion. In some case, the affecting order may affect more than one motion. Various aspects of the present disclosure provide functionality for identifying and linking affecting orders with the respective affected motion or motions.

In one particular embodiment, a method includes receiving docket data associated with a structured proceeding, the docket data including at least one docket entry, identifying, by an automated analysis, one or more docket entries of the at least one docket entry correspondingly associated with one or more motions in the structured proceeding, and identifying, by the automated analysis, one or more docket entries of the at least one docket entry correspondingly associated with one or more orders in the structured proceeding. Identifying the one or more docket entries correspondingly associated with the one or more orders includes identifying at least one order of the one or more orders that includes a results-affecting decision affecting at least one motion. The method further includes linking, by the automated analysis, the at least one motion to the at least one order.

In another embodiment, a system may be provided. The system may include an input/output module configured to receive docket data associated with a structured proceeding, the docket data including at least one docket entry. The system may also include a motions and orders detector configured to identify one or more docket entries of the at least one docket entry correspondingly associated with one or more motions in the structured proceeding, and to identify one or more docket entries of the at least one docket entry correspondingly associated with one or more orders in the structured proceeding. The configuration of the motions and orders detector to identify the one or more docket entries correspondingly associated with the one or more orders includes configuration of the motions and orders detector to identify at least one order of the one or more orders that includes a results-affecting decision affecting at least one motion. The motions and orders detector may be further configured to link the at least one motion to the at least one order.

In yet another embodiment, a computer-based tool may be provided. The computer-based tool may include non-transitory computer readable media having stored thereon computer code which, when executed by a processor, causes a computing device to perform operations that include receiving docket data associated with a structured proceeding, the docket data including at least one docket entry, identifying, by an automated analysis, one or more docket entries of the at least one docket entry correspondingly associated with one or more motions in the structured proceeding, and identifying, by the automated analysis, one or more docket entries of the at least one docket entry correspondingly associated with one or more orders in the structured proceeding. Identifying the one or more docket entries correspondingly associated with the one or more orders includes identifying at least one order of the one or more orders that includes a results-affecting decision affecting at least one motion. The operations further include linking, by the automated analysis, the at least one motion to the at least one order.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
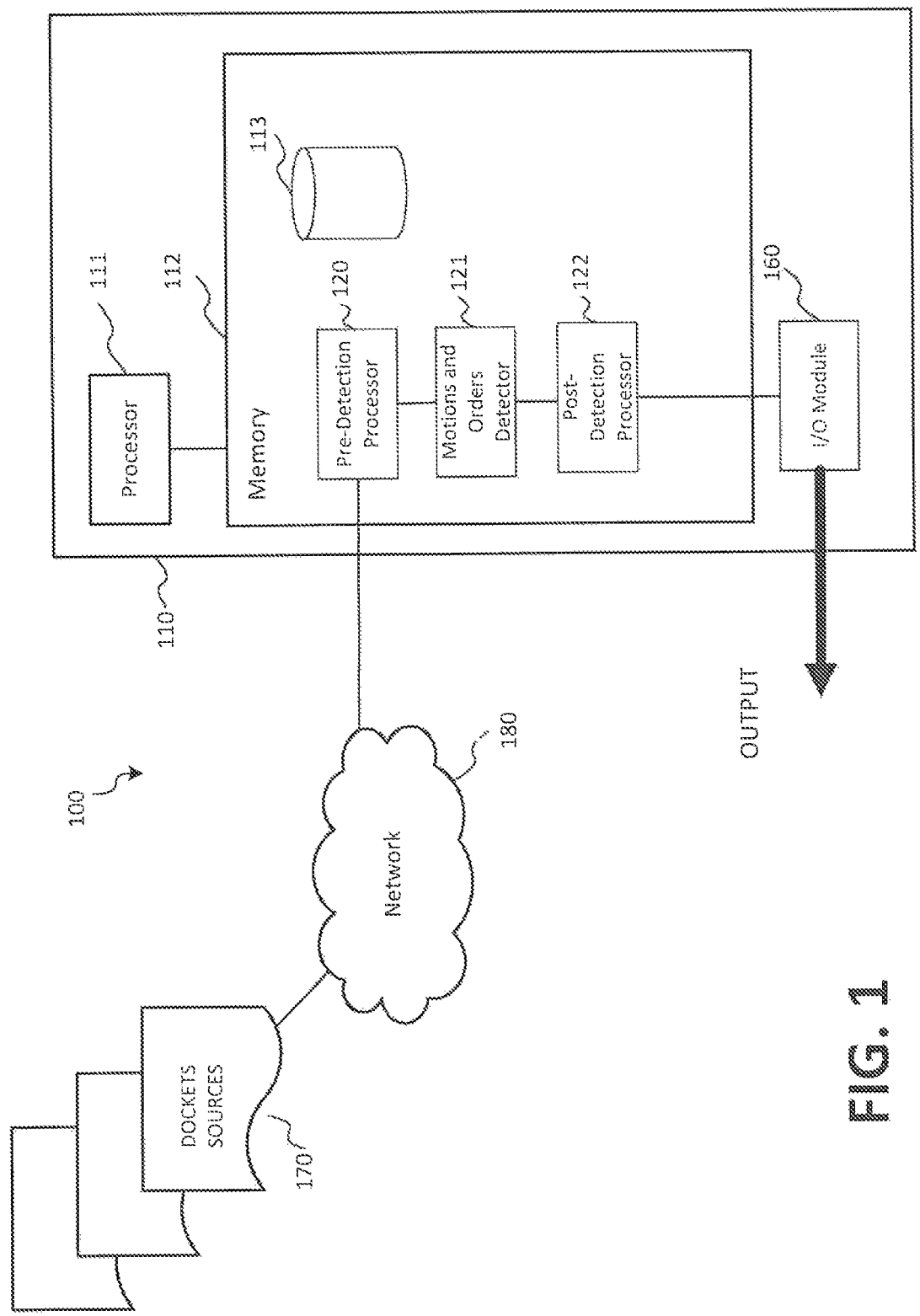
FIG. 1 shows a system configured to perform operations in accordance with embodiments of the present disclosure.

FIG. 1 is a block diagram of an exemplary system 100 configured with capabilities and functionality for analyzing and extracting docket data related to a structured proceeding, for identifying, based on the analysis, docket entries associated with motions and docket entries associated with orders, for determining motions that are affected by results-affecting decisions in the orders, and for linking the affected motions to the affecting orders. System 100 includes server 110, dockets sources 170, and network 180. These components, and their individual components, may cooperatively operate to provide functionality in accordance with the discussion herein. For example, in operation according to embodiments, docket entries for particular dockets may be obtained from dockets sources 170 and may be provided as input to server 110. The various components of server 110 may cooperatively operate to analyze the data in the docket entries, which may include docket summaries, documents and/or other information, and may apply customized rules and machine learning algorithms to identify docket entries corresponding to motions and docket entries corresponding to orders, and to link affecting orders to affected motions. In some aspects, an indicator may be generating indicating the link between the affecting order and the affected order or orders. The indicator may be provided to a user, or may be stored in a database for subsequent retrieval.

The functional blocks, and components thereof, of system 100 of embodiments of the present invention may be implemented using processors, electronic devices, hardware devices, electronic components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

In some aspects, server 110 and dockets sources 170 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc.

Docket sources 170 may comprise at least one source of docket data. Docket data may include any data related to events and/or actions, such as motions, hearings, filings, decisions, etc., that occur during structured proceedings (e.g., a court proceeding). The information related to a particular structured proceeding may be structured as a docket, and may include docket entries. In some cases, a docket entry may include information related to an event, or more than one event, in the structured proceeding. The data for the various docket entries may include summaries, documents, text, data streams, metadata, etc. It is noted that in the present disclosure, the data for the various docket entries of a particular docket may be referred to as a docket. In aspects, the dockets of docket sources 170 may be received from court systems, and/or may be received from an external database or system, such as the public access to court electronic records (PACER) service.

Server 110 may be configured to receive docket data (e.g., docket entries) from dockets sources 170, to apply customized rules and machine learning algorithms to identify docket entries corresponding to motions and docket entries corresponding to orders, and to link affecting orders to affected motions. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some embodiments, server 110 may be implemented, wholly or in part, on an on-site system, or on a cloud-based system.

As shown in FIG. 1, server 110 includes processor 111, memory 112, database 113, pre-detection processor 120, motions and orders detector 121, post-detection processor 122, and input/output (I/O) module 160. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure.

In aspects, memory 112 may also be configured to facilitate storage operations. For example, memory 112 may comprise database 113 for storing analysis data, models, classifiers, rankers, usage metrics, analytics, user preferences, affecting orders, affected motions, linkage indicators (e.g., indicating a link between an affecting order and an affected motion), etc., which system 100 may use to provide the features discussed herein. Database 113 may be integrated into memory 112, or may be provided as a separate module. In some aspects, database 113 may be a single database, or may be a distributed database implemented over a plurality of database modules. In some embodiments, database 113 may be provided as a module external to server 110.

Figure 2:
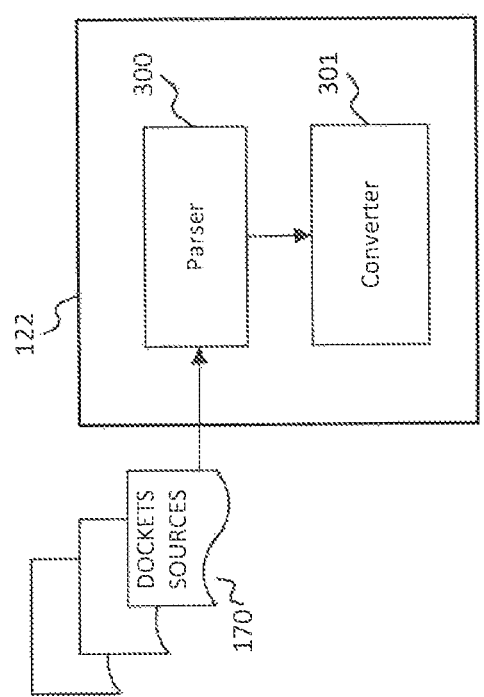
FIG. 2 shows a block diagram illustrating functionality of a pre-detection processor for conditioning docket data for subsequent analysis in accordance with aspects of the present disclosure.

Pre-detection processor 120 may be configured to process docket data (e.g., docket entries) received from dockets sources 170 in order to condition the docket data for subsequent analysis. The functionality of pre-detection processor 120 will now be discussed with respect to the block diagram illustrated in FIG. 2. FIG. 2 shows a block diagram illustrating functionality of a pre-detection processor for conditioning docket data for subsequent analysis in accordance with aspects of the present disclosure. As shown, pre-detection processor 120 may include parser 300 and converter 301. In aspects, parser 300 may be configured to parse the docket data and generate a data structure from the information in the docket entries. For example, in one particular implementations, the docket data may be received in an extensible markup language (XML) format. In this case, parser 300 may extract the relevant and important information from the XML data and may generate a report and/or data in an unstructured format, which may be used to facilitate annotating the docket entries. In other implementations, the docket data may be received unstructured, in which case the relevant and important information in the docket entries may be extracted and compiled into an unstructured data report. In other embodiments, the unstructured relevant and important data may be compiled into a data structure defined using an XML format.

Converter 301 may be configured to analyze and convert the unstructured data into a format that may facilitate content analytics and tracking of the various annotations made to the parsed docket data. For example in a particular implementation, an unstructured information management architecture (UIMA) framework may be used, and the parsed unstructured data may be converted into a UIMA type data. The UIMA framework may provide content analytics in order to take advantage and combine the different functionalities of the present disclosure.

With reference back to FIG. 1, motions and orders detector 121 may be configured to provide functionality for analyzing the docket entries in the docket data, for identifying docket entries associated with motions and docket entries associated with orders, for determining motions that are affected by the orders, and for linking the affected motions to the affecting orders. In aspects, the functionality of motions and orders detector employs a combination of customized rules and/or machine learning algorithms, which results in a more robust system that provides a high level of accuracy and flexibility. Motions and orders detector 121 may be configured to provide the functionality to identify and link affecting orders and affected motions using several approaches.

Figure 3:
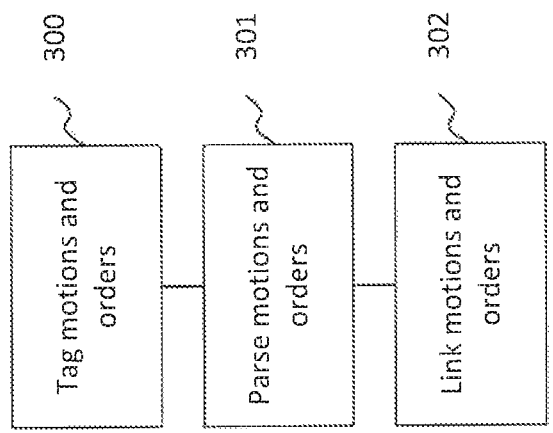
FIG. 3 shows a flow diagram illustrating a rule-based/machine learning hybrid approach in accordance with aspects of the present disclosure.

One particular approach used by motions and orders detector 121 to identify and link affecting orders and affected motions includes a rule-based/machine learning hybrid approach. In aspects, under this approach, a rule-based analysis may be combined a hybrid machine learning analysis, which may boost recall for some of motions and orders. This rule-based/machine learning hybrid approach will now be discussed with respect to the block diagram illustrated in FIG. 3. FIG. 3 shows a flow diagram illustrating a rule-based/machine learning hybrid approach in accordance with aspects of the present disclosure. At block 300, motions and orders included in the docket data are tagged. In aspects, tagging motions and orders may include applying customized rules to the docket data to identify docket entries associated with motions, and docket entries associated with orders. For example, customized rules may be applied to identify docket entries in which motions have been filed, and docket entries in which orders have been issued. In some embodiments, a single order may affect more than one motion. As will be discussed below, a system implemented in accordance with the functionalities described herein may be capable of identifying this situation and link the order to every affected motion.

In aspects, the customized rules for identifying docket entries associated with motions, and docket entries associated with orders may include a set of high precision rules that may allow avoiding over-tagging of motions and orders mentioned in relevant case events and/or docket entries, which may not necessarily be the case event and/or docket entry in which a motion has been filed. In one particular rule implementation, a template rule may be applied to docket entries to search for a position of a first keyword within a docket entry. In addition, the template rule may also look for a second keyword associated with a type around the position of the first keyword (e.g., within a predetermined number of characters or a predetermined number of words). When the second keyword is found around the first keyword in the docket entry, a determination may be made as to whether the docket entry is a motion or an order. For example, template rule may be applied to docket entries to search for a position of the word "motion" within a docket entry. A second keyword associated with a type of motion, around the position of the word "motion" may be searched (e.g., within a predetermined number of words from the word "motion."). For example, the second keyword may be one of "to dismiss," for summary judgement," "in limine," and/or any other word or phrase indicating a motion type, etc. In some embodiments, additional keywords may be searched for, such as a tiling party and/or a filing date. If the keyword(s) are found within the docket entry around the position, the docket entry is determined to be a "motion." For example, a particular docket entry may be a docket entry in which a motion was filed and thus, may include not only the word motion and the type of motion, but also a filing party, and/or other elements associated with a filing of the particular motion. In this example, another docket entry may refer to the motion, but may not be the docket entry in which the motion was filed, and thus, may not include all the elements of the template rule. In this case, the particular docket entry may be determined to be the filing of the motion and the other docket entry may not be deemed the docket entry in which the motion was filed. It is noted that, some docket entries may include a motion and may also reference other motions. For example, a motion may be a response to another motion. In this case, the responsive motion and the original motion may both be identified as motions, and an order may affect either or both motions. The same process may be used to identify orders.

It will be appreciated that the application of the template rules, which allow identifying motions and orders by matching them to a particular template structure associated with the various motions and orders, prevents over tagging motions, such as docket entries that merely reference a motion rather than docket entries in which motions are filed, because docket entries that merely reference a motion may not include all the elements required in the template. It is also noted that, in some aspects, various template rules may be used for various motions and orders. For example, a template rule may be used to identify motions to dismiss, and another template rule may be used to identify motion for summary judgement, etc.

At block 301, the docket entries tagged as motions and orders may be parsed. For example, after a docket entry has been identified as including a filing of a motion or issuance of an order, the docket entry may be parsed in order to extract particular data. With respect to motions, docket entries tagged as motions may be analyzed to extract information that may include a motion type, and/or a filing party. With respect to orders, docket entries tagged as orders may be analyzed to extract information that may include any motion(s) affected by the decision(s) in the order, the decision(s) in the order (e.g., granting, denying, etc.), and/or the name of the decision make issuing the decision (e.g., a judge's name).

In aspects, extracting the information from the docket entries tagged as motions and the docket entries tagged as orders may include a hybrid approach that uses handcrafted rules and machine learning to extract the information. For example, in some embodiments, template rules as discussed above with respect to block 300 may be used to identify the information. In other embodiments, rules may be used to automatically label training examples with a surrogate label. The surrogate label may be a word or a sequence of words that may highly correlate with a target information (e.g., target motion type, target filing party, target affected motion(s), target decision, target decision maker, etc.). The automatically generated training dataset may then be used to train a support vector machine (SVM) classifier that may then be used to predict any target information in the docket entry. In aspects, using an SVM classifier may include encoding the docket entries as fixed dimensional vectors which are then feed into the classifier to classify the docket entries into respective target classes (e.g., target information).

At block 302, the motions and orders are linked based on the parsed information. As noted above, an order may include at least one results-affecting decision. The results-affecting decision may affect or be related to at least one motion. In some cases, the results-affecting decision may affect more than one motion, such as a motion and its responsive motion. The order may include more than one decision, and each decision may affect one or more motions. Linking the motions and orders may include associating an order and the motion(s) affected by the order. In some cases, an indicator may be generated indicating the association. In aspects, the indicator may be a word, a flag, a color code, a field, and/or any other means for indicating the affecting order and the affected motion.

In some aspects, the motion(s) affected by an order may not be included in the docket entries tagged as motions at block 300. For example, the analysis at block 300 may have failed to identify the docket entry in which the affected motion was filed. In this case, the information about the affected motion(s) included in the affecting order may be extracted and the docket entries in the docket data may again be analyzed, based on the data extracted from the order, to identify the docket entry or entries in which the affected motion(s) was/were filed. As will be appreciated, this additional analysis represents a more targeted and refined analysis to identify the affected motion(s). In some embodiments, the initial analysis performed at block 300 may be skipped entirely, and instead, the motion(s) affected by an order may instead be identified based on the information in the order.

Another approach used by motions and orders detector 121 to identify and link affecting orders and affected motions may include a token tagging approach. In aspects, the token tagging approach may be based on a machine learning-based approach to tagging all tokens in every docket entry and extracting the motions and orders from the text of the docket entries. In a sense, the token tagging approach may be complementary to the rule-based/machine learning hybrid approach discussed herein, and represents an end-to-end machine learning-based approach. Under this approach, identifying docket entries correspondingly associated with motions and docket entries correspondingly associated with orders may include formulating the task as a sequence labeling task that includes treating each docket entry as a sequence of words. In aspects, the docket entries are applied to a machine learning model that appropriately classifies the docket entries into motions or orders. The machine learning model may be trained using annotated data. During training operations, subject matter experts may identify whether a training docket entry includes a concept of interest, such as a motion type, an order decision action, etc., and may annotate the relevant span of words for each concept. The annotations may then be converted to a sequence of labels, with one label assigned to each word in the docket entry. The machine learning model may then be trained using the sequence of labels and the annotated data. In aspects, the machine learning model may learn to predict the labels and may learn to predict the correct sequence of labels associated with motions and/or orders. This token tagging approach will now be discussed with respect to the block diagram illustrated in FIG. 4.

Figure 4:
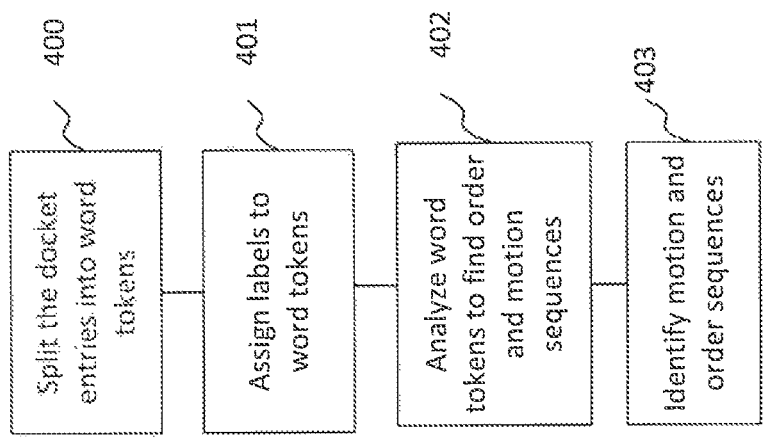
FIG. 4 shows a flow diagram illustrating a token tagging approach in accordance with aspects of the present disclosure.

FIG. 4 shows a flow diagram illustrating a token tagging approach in accordance with aspects of the present disclosure. At block 400, the docket entries in the docket data may be split into word tokens. At block 401, the word tokens of the docket entries may each be assigned a label. For example, the various word tokens may be fed into a machine learning model, such as the machine learning model described above, and the machine learning model may predict a label to assign for each word token. For example, a docket entry of the form "motion to dismiss by defendant XYZ Inc" may be split into word tokens, and each word token may then be assigned a label. Table 1 illustrates the assignment of labels to the word tokens of this example.

TABLE 1

| Motion | to | dismiss | by | defendant | XYZ | Inc. |
|--------|----|---------|----|-----------|-----|------|
| Motion-Anchor | O | Motion-Type | O | Motion-Role | Motion-Party | Motion-Party |

As can be seen in Table 1, the example docket entry may be split into word tokens, and each word token may be assigned a label. In this example, a label "C)" may be assigned to word tokens that may not be associated with a relevant concept (e.g., motion type, motion party, motion role, etc.). At block 402, the labeled word tokens may be analyze to determine whether at least one of a motion label sequence and an order label sequence is present. In aspects, the labeled word tokens may be fed into the machine learning model. As noted above, the machine learning model may have learned from the annotations to the docket entries, that a particular sequence of labels may indicate a particular type of docket entry (e.g., motion or order). For example, given the above example docket entry, the example docket entry above may have been previously identified and annotated by an expert as a motion to dismiss. The machine learning model may have then learned from the annotations that the sequence of labels of the example docket entry indicates a motion to dismiss by a party. As such, when the example docket entry, or any other docket entry including a similar sequence of labels, is found during operations, the machine learning model identifies the docket entry as a motion to dismiss by the party. It will be appreciated that the same functionality may be applied to docket entries including orders. In aspects, a motion label sequence may be a sequence of labels that predicts a motion, and an order label sequence may be a sequence of labels that predicts an order.

In aspects, various sequence labeling models may be used in the token tagging approach. In one model, a conditional random field (CRF) model may be used to predict word token labels and sequences of labels for the various target types. The input to the CRF model may include a number of lexical and syntactic features. Another sequence labeling model that may be used includes a using a CRF, but instead of defining features explicitly, a recurrent neural network (RNN) may be used to automatically learn useful features directly from the input sequence of word tokens. In some implementations, each word token may be converted into a high-dimensional vector through a word-embedding layer and then may be fed to a bi-directional Long Short-Term Memory (Bi-LSTM) network. The resulting encoding vectors may be fed to the CRF as features for learning the correct sequence of labels to generate for the target types.

In aspects, the word-embedding layer used in the RNN approach may include three components. Each component may attempt to construct a useful vector representation of the word tokens in a docket entry. A first component may include a word-level embedding representation that may be pre-trained on a large corpus of dockets. A second component may construct a word-level embedding by feeding individual characters of a word token into a secondary Bi-LSTM network, the output of which may be treated as another representation for the word token. A third component of the embedding layer may take as input the part-of-speech tag of the word token and may transform the tag into a dense vector representation. The output vectors from all three components may be combined to form the final embedded representation of the word token to be fed into the first Bi-LSTM network.

At block 403, based on the word token labels and the sequences of labels found in the docket entries, motions and orders are identified. As noted above, a motion label sequence may be a sequence of labels that predicts a motion, and an order label sequence may be a sequence of labels that predicts an order.

Yet another approach used by motions and orders detector 121 to identify and link affecting orders and affected motions may include a tree-based approach. In aspects, the tree-based approach may utilize a tree defined for motions and orders. In these cases, analyzing the docket entries may create a tree to represent the respective motions and orders mentioned in the docket entries. Each word token of a docket entry may be represented within a feature vector to generate features, and the features may be fed into a model (e.g., a linear function) to calculate a probability that the docket entry corresponds to a particular tree representing a docket entry type (e.g., motion or order). The tree-based approach may use a multiplicity of predefined trees (e.g., any number up to an infinite number), and may select the best tree for a particular docket entry. In some implementations, the selected tree may be normalized to extract facts from the docket entry. The tree-based approach may use a parsing algorithm for context-free grammars, such as the Cocke-Younger-Kasami (CYK) parsing algorithm, to determine which a tree with the highest score. The tree models that may be used to select a tree in this approach may include a probabilistic context free grammar (PCFG) model that may be related to the structure of the tree to be predicted and selected. The parsing algorithm in this PCFG approach may implement the probabilistic assumptions and methods of a CRF. In some embodiments, a CRF may include to a process for estimating the likelihood of a certain kinds of graphical models. The graphical model may include a model in which a prediction may be made for each node of a graph. In this case, factors that may influence the prediction for each node may be predefined, such as the state of some ancestor node and observations related to the node's structure (e.g., features derived from a word token, span of a sentence corresponding to the node, etc.).

The tree-based approach of embodiments may also be referred to as a constituency parsing approach. In aspects, the semantic meaning of a docket entry may be captured as a tree (or directed graph) with various classes of nodes and edges. In these cases, permissible trees may be defined by a grammar. As such, nodes of a tree may be the atomic units of information of a docket entry, and may include a definable surface form in the docket entry text. The edges may include the relationships between the nodes and may tend to have considerably more variance in their textual evidence. The tree-based approach will now be discussed with respect to the block diagram illustrated in FIG. 5.

Figure 5:
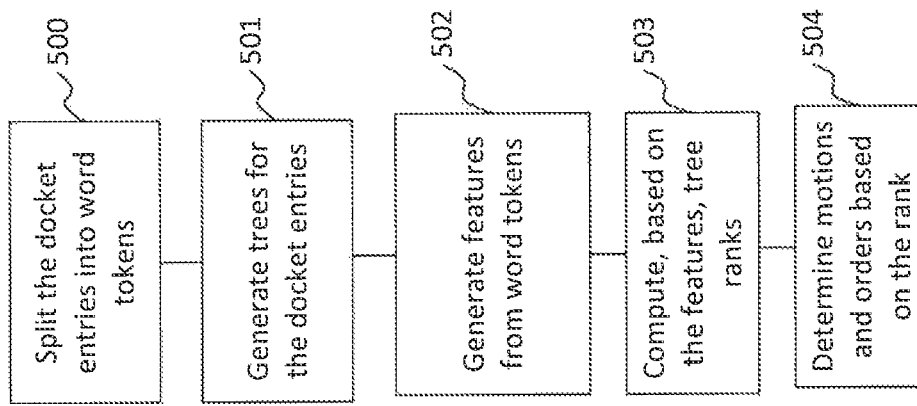
FIG. 5 shows a flow diagram illustrating a tree-based approach in accordance with aspects of the present disclosure.
Figure 7:
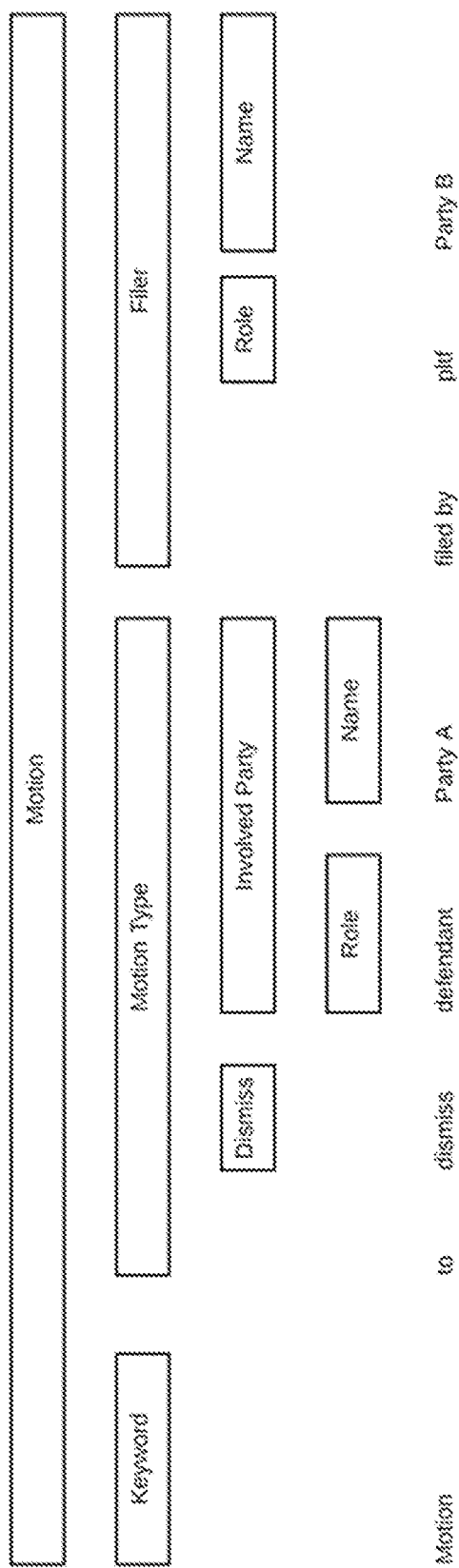
FIG. 7 shows an example parse tree into which a docket entry for a motion may be parsed.

FIG. 5 shows a flow diagram illustrating a tree-based approach in accordance with aspects of the present disclosure. At block 500, the docket entries in the docket data may be split into word tokens. For example, each docket entry may be split into word tokens. Table 1 above shows a docket entry split into tokens. At block 501, at least one tree may be generated for the docket entries. For example, each word token of a particular docket entry may have a function in the docket entry. The word tokens may be combined based on their function to form a parse tree. For example, FIG. 7 shows an example parse tree into which a docket entry for a motion may be parsed.

As can be seen, a motion docket entry may be parsed into a tree in which the highest node may be the motion. The motion may include a type, filer, and keyword attributes. The filer attribute may include a name and a role, and the keyword attribute may include a dismiss and party attribute.

In aspects, parsing the docket entries into a tree may include finding the most probable parse tree for a docket entry using a tree-form CRF. Using a tree-form CRF may be a generalization of the linear-chain CRF used in the token tagging approach described above.

In general, the tree-based representation of a docket entry may be considered a generalization of the token tagging approach in that tags may be directly analogous to the nodes of the tree. The tagging approach, however, flattens all the relations to one level, whereas the tree-based representation may have different levels. In the example docket entry above, the role tag is an attribute of the filer and not the motion. However, this distinction may not be modeled with the token tagging approach. Practically, the token tagging approach requires additional inference to combine the labels into facts, whereas the tree-based approach may represents the facts in full.

In aspects, a docket entry parsed tree using this tree-based approach may be partial. In this case, there may not be information about many of the word tokens in each docket entry, and these word tokens may be excluded from the resulting parse tree. For example, dummy right-recursive rules may be created to account for word tokens determined to be excluded from the parse tree. Other implementations, such as using shift-reduce methods, could be adapted to ignore unimportant words.

In aspects, each docket entry may be parsed into a tree. Parsing the docket entries into a tree may include finding the most probable parse tree for a docket entry using a tree-form CRF. In aspects, using a tree-form CRF may be a generalization of the linear-chain CRF used in the token tagging approach described above. In some implementations, bag-of-words and parts-of-speech features may be used to parse the docket entry into trees. In aspects, neural word representations may be used.

At block 502, features may be generated from the word tokens of the docket entries. In aspects, the generation of the features from the word tokens may use a similar approach to the generation of the features discussed above with respect to the token tagging approach. In some implementations, bag-of-words and parts-of-speech features may be used to parse the docket entry into trees. In some aspects, neural word representations may be used.

At block 503, the features of the from the word tokens may be fed into a model (e.g., a linear function) to calculate a probability that the parse tree generated from the docket entry is a parse tree associated with one of a motion and order. In embodiments, calculating the probabilities may include ranking the trees based on the probability. In these cases, a higher ranked tree has a higher probability of being the correct tree for the particular docket entry than a lower ranked tree. In aspects, this may include not only determining the probability that the tree is a motion or order tree, but also the type of motion, the type of order, and other information in the docket entry. In this sense, a motion affected by an order may be identified by a tree created by the information in the affecting order. The affected motion may then be identified by calculating the probability that the parse trees generate for particular docket entries match the parse tree of the affected motion.

At block 504, docket entries associated with motions and docket entries associated with orders may be determined based on the ranks obtained at block 503. For example, a docket entry may be determined to be a given motion to dismiss by party XYZ, when the parse tree of the docket entry has a high probability of being the parse tree of the given motion, or when the parse tree of the given motion is the highest rank tree for the docket entry, based on the parse tree of the docket entry.

With reference back to FIG. 1, post-detection processor 122 may be configured to process linked motions and orders for subsequent output, usage, storage, etc. In some aspects, the functionality of post-detection processor 122 may include a UIMA to Java converter, which may be configured to convert the UIMA structures for the linked motions and orders into Java objects. In some aspects, the functionality of post-detection processor 122 may also include merging the linked motions and orders with other sources and/or systems that may include motion and order parsing mechanisms. In this manner, the functionality of post-detection processor 122 may allow for leveraging external systems for error-checking and/or supplementing the results of motions and orders detector 121.

In some embodiments, system 100 may include I/O module 160. I/O module 160 may be configured to accept input from users, such as a request by a user to identify affecting orders and affected motions, and to output information to the user, such as indications indicating a motion or motions affected by an order. In some embodiments, I/O module 160 may be configured to interface the functionality of system 100 with other systems, such as systems in a publishing pipelines that may include providing the identified linked motions and orders to other applications, and/or storing the information into a database for subsequent use.

Figure 6:
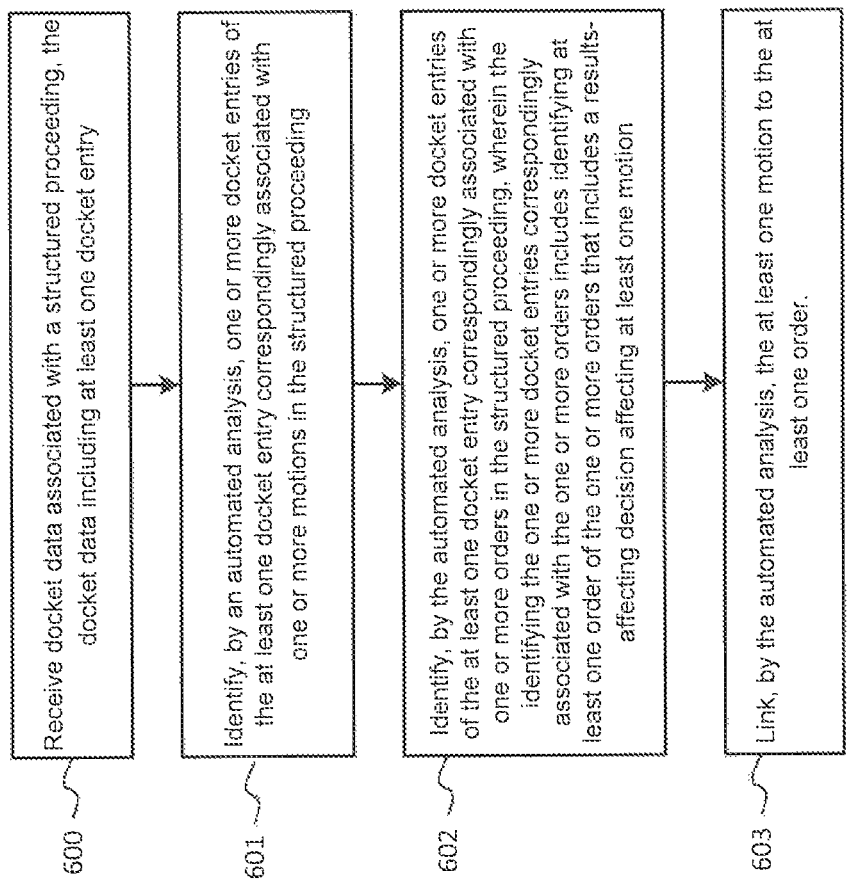
FIG. 6 shows an operational flow diagram illustrating example blocks executed to implement aspects of the present disclosure.

FIG. 6 shows a high level flow diagram of operation of a system configured in accordance with aspects of the present disclosure for analyzing and extracting docket data related to a structured proceeding, for identifying, based on the analysis, docket entries associated with motions and docket entries associated with orders, for determining motions that are affected by results-affecting decisions in the orders, and for linking the affected motions to the affecting orders. The functions illustrated in the example blocks shown in FIG. 6 may be performed by system 100 of FIG. 1 according to embodiments herein.

At block 600, docket data associated with a structured proceeding involving at least one party is received. In aspects, the docket may be received from a docket source, such as from dockets sources 170. The docket data may include at least one docket entry, and the at least one docket entry may include information on at least one event. The at least one event may include a motion, an order, etc. In some aspects, the docket data may be pre-processed such as by parsing a structured data to extract important and relevant information, and converting information into UIMA type structure.

At block 601, the docket entries in the docket data received at block 600 are analyzed by an automated analysis to identify docket entries correspondingly associated with motions in the structured proceeding. At block 602, the docket entries in the docket data received at block 600 are analyzed by the automated analysis to identify docket entries correspondingly associated with orders in the structured proceeding. In aspects, identifying docket entries correspondingly associated with motions and orders may include applying customized rules to the docket data. For example, customized rules for identifying docket entries associated with motions, and docket entries associated with orders may using template rules that may be applied to docket entries to identify docket entries matching the template rules. In embodiments, various template rules may be used for various motions and orders. For example, a template rule may be used to identify motions to dismiss, and another template rule may be used to identify motion for summary judgement, etc.

In aspects, identifying the docket entries correspondingly associated with the orders may include identifying at least one order that includes a results-affecting decision affecting at least one motion. In embodiments, the affecting order may affect more than one motion, e.g., an order deciding an original motion and responsive motion, and/or an order including more than one decision for more than one motion. Identifying the docket entries correspondingly associated with the motions may also include determining one or more of: a type of motion of the motions, at least one party associated with each of the motions, and a party respectively filing the motions. Identifying the docket entries correspondingly associated with the orders may include determining one or more of: the results-affecting decision of each of the orders, at least one motion affected by each of the orders, and a name of a party respectively issuing the orders.

In aspects, identifying the docket entries correspondingly associated with the motions and identifying the docket entries correspondingly associated with the orders may include identifying, based on predetermined rules, at least one of docket entries in which motions are filed and docket entries in which orders are issued, tagging the docket entries in which motions are filed as motions and the docket entries in which orders are issued as orders. This process for identify the motions and orders may also include parsing the docket entries tagged as motions to identify, for each motion, a motion type and/or a party filing the motion, and parsing the docket entries tagged as orders to identify, for each order, the motion(s) affected by each order, the results-affecting decision of each order, and/or a name of the decision maker issuing each order.

In further aspects, identifying the docket entries correspondingly associated with the motions and identifying the docket entries correspondingly associated with the orders may splitting each of the docket entries in the docket data into word tokens, applying the word tokens into a sequence label model to assign a label to each word token of the word tokens, and analyzing the labeled word tokens to determine whether a motion label sequence and/or an order label sequence is present. In embodiments, the motion label sequence is a sequence of labels that predicts a motion, and the order label sequence is a sequence of labels that predicts an order. This process of identifying motions and orders may also include determining that a docket entry that includes the motion label sequence is correspondingly associated with a motion, and determining that a docket entry that includes the order label sequence is correspondingly associated with an order.

In yet further aspects, identifying the docket entries correspondingly associated with the motions and identifying the docket entries correspondingly associated with the orders may splitting each of the docket entries in the docket data into word tokens, generating at least one feature for each of the word tokens, applying the generated features to a tree model (e.g., a PCFG model) to generate one or more trees for each docket entry. In embodiments, the trees indicate a classification to a motion class and/or an order class. This process of identifying motions and orders may also include computing, based on the features of the word tokens, a rank for each of the trees associated with a docket entry, and determining, based on the rank for each tree, whether the docket entry is a motion or an order.

At block 603, the motion or motions determined to be affected by an affecting order are linked to the affecting order. In aspects, linking the affecting order to the affected motion(s) may include determining whether the affected motion(s) is/are included in the motions identified at block 601. When it is determine that the affected motion(s) is/are not included in the motions identified at block 601, the docket entries of the docket data may be analyzed to identify the docket entries associated with the affected motion(s). In aspects, this analysis may be based on the affecting order and the affected motion(s). In some embodiments, an indicator indicating the results-affecting decision affecting the affected motion(s) may be generating in association with the affected motion(s). In aspects, the indicator may be a word, a flag, a color code, a field, and/or any other means for indicating the affecting order and the affected motion(s).

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-6 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method comprising:
    receiving docket data associated with a structured proceeding, the docket data including at least one docket entry;
    identifying, by an automated analysis, one or more docket entries of the at least one docket entry correspondingly associated with one or more motions in the structured proceeding;
    identifying, by the automated analysis, one or more docket entries of the at least one docket entry correspondingly associated with one or more orders in the structured proceeding, wherein the identifying the one or more docket entries correspondingly associated with the one or more orders includes identifying at least one order of the one or more orders that includes a results-affecting decision affecting at least one motion, wherein the identifying the one or more docket entries correspondingly associated with one or more motions and identifying the one or more docket entries correspondingly associated with one or more orders includes:
- splitting each of the at least one docket entry into word tokens;
- generating at least one feature for each of the word tokens;
- applying the at least one feature to a probabilistic context-free grammar parsing (PCFG) algorithm to generate one or more trees for each docket entry of the at least one docket entry, the one or more trees indicating a classification to one of: a motion class and an order class;
- computing, based on the at least one feature, a rank for each tree associated with a docket entry of the at least one docket entry; and
- determining, based on the rank for each tree associated with a docket entry, whether the docket entry is one of: a motion and an order; and
- generating a dashboard that links, by the automated analysis, the at least one motion to the at least one order, wherein the linking includes providing an indicator including one or more of: a word, a flag, a color code, and a field that indicates the results-affecting decision affecting the at least one motion in association with the affected at least one motion.

2. The method of claim 1, wherein the linking the at least one motion to the at least one order includes:
- determining whether the at least one motion affected by the at least one order is included in the one or more motions; and
- analyzing, when the at least one motion affected by the at least one order is not included in the one or more motions, the at least one docket entry of the docket data, based on the at least one order and the at least one motion affected by the at least one order, to identify a docket entry corresponding to the at least one motion affected by the at least one order.

3. The method of claim 1, further comprising analyzing the one or more docket entries correspondingly associated with the one or more motions to determine one or more of: a type of motion of at least one of the one or more motions, at least one party associated with the at least one of the one or more motions, and a party filing the at least one of the one or more motions.

4. The method of claim 1, further comprising analyzing the one or more docket entries correspondingly associated with the one or more orders to determine one or more of: the results-affecting decision of at least one of the one or more orders, the at least one motion affected by the at least one of the one or more orders, and a name of a party issuing the at least one of the one or more orders.

5. The method of claim 4, wherein determining the results-affecting decision of the at least one of the one or more orders includes identifying a keyword in a docket entry correspondingly associated with the at least one of the one or more orders, the keyword associated with the results-affecting decision.

6. The method of claim 1, wherein the identifying the one or more docket entries correspondingly associated with one or more motions and identifying the one or more docket entries correspondingly associated with one or more orders includes:
- identifying, based on predetermined rules, at least one of: docket entries in which motions are filed and docket entries in which orders are issued;
- tagging the docket entries in which motions are filed as motions and the docket entries in which orders are issued as orders;
- parsing, based on at least one machine learning algorithm, the docket entries tagged as motions to identify, for each motion, at least one of: a motion type and a party filing the motion; and
- parsing, based on the at least one machine learning algorithm, the docket entries tagged as orders to identify, for each order, at least one of: the at least one motion affected by each order, the results-affecting decision of each order, and a name of a decision maker issuing each order.

7. The method of claim 1, wherein the identifying the one or more docket entries correspondingly associated with one or more motions and identifying the one or more docket entries correspondingly associated with one or more orders includes:
- splitting each of the at least one docket entry into word tokens;
- applying the word tokens into a sequence label model to assign a label to each word token of the word tokens;
- analyzing the labeled word tokens to determine whether at least one of a motion label sequence and an order label sequence is present, the motion label sequence being a sequence of labels that predicts a motion, and the order label sequence being a sequence of labels that predicts an order;
- determining that a docket entry that includes the motion label sequence is correspondingly associated with a motion; and
- determining that a docket entry that includes the order label sequence is correspondingly associated with an order.

8. A system comprising:
- an input/output module configured to receive docket data associated with a structured proceeding, the docket data including at least one docket entry;
- a motions and orders detector configured to:
    - identify one or more docket entries of the at least one docket entry correspondingly associated with one or more motions in the structured proceeding;
    - identify one or more docket entries of the at least one docket entry correspondingly associated with one or more orders in the structured proceeding, wherein the configuration of the motions and orders detector to identify the one or more docket entries correspondingly associated with the one or more orders includes configuration of the motions and orders detector to identify at least one order of the one or more orders that includes a results—affecting decision affecting at least one motion, wherein the configuration of the motions and orders detector to identify the one or more docket entries correspondingly associated with one or more motions and identifying the one or more docket entries correspondingly associated with one or more orders includes:
        - configuration of the motions and orders detector to split each of the at least one docket entry into word tokens;

configuration of the motions and orders detector to generate at least one feature for each of the word tokens;

configuration of the motions and orders detector to apply the at least one feature to a probabilistic context-free grammar parsing (PCFG) algorithm to generate one or more trees for each docket entry of the at least one docket entry, the one or more trees indicating a classification to one of: a motion class and an order class;

configuration of the motions and orders detector to compute, based on the at least one feature, a rank for each tree associated with a docket entry of the at least one docket entry; and configuration of the motions and orders detector to determine, based on the rank for each tree associated with a docket entry, whether the docket entry is one of: a motion and an order; and generate a dashboard that links the at least one motion to the at least one order, wherein the linking includes providing an indicator including one or more of: a word, a flag, a color code, and a field that indicates the results-affecting decision affecting the at least one motion in association with the affected at least one motion.

9. The system of claim 8, wherein the configuration of the motions and orders detector to link the at least one motion to the at least one order includes configuration of the motions and orders detector to:

determine whether the at least one motion affected by the at least one order is included in the one or more motions; and analyze, when the at least one motion affected by the at least one order is not included in the one or more motions, the at least one docket entry of the docket data, based on the at least one order and the at least one motion affected by the at least one order, to identify a docket entry corresponding to the at least one motion affected by the at least one order.

10. The system of claim 8, further comprising configuration of the motions and orders detector to analyze the one or more docket entries correspondingly associated with the one or more motions to determine one or more of: a type of motion of at least one of the one or more motions, at least one party associated with the at least one of the one or more motions, and a party filing the at least one of the one or more motions.

11. The system of claim 8, further comprising configuration of the motions and orders detector to analyze the one or more docket entries correspondingly associated with the one or more orders to determine one or more of: the results-affecting decision of at least one of the one or more orders, the at least one motion affected by the at least one of the one or more orders, and a name of a party issuing the at least one of the one or more orders.

12. The system of claim 11, wherein the configuration of the motions and orders detector to determine the results-affecting decision of the at least one of the one or more orders includes configuration of the motions and orders detector to identify a keyword in a docket entry correspondingly associated with the at least one of the one or more orders, the keyword associated with the results-affecting decision.

13. The system of claim 8, wherein the configuration of the motions and orders detector to identify the one or more docket entries correspondingly associated with one or more motions and to identify the one or more docket entries correspondingly associated with one or more orders includes configuration of the motions and orders detector to:

identify, based on predetermined rules, at least one of: docket entries in which motions are filed and docket entries in which orders are issued;

tag the docket entries in which motions are filed as motions and the docket entries in which orders are issued as orders;

parse, based on at least one machine learning algorithm, the docket entries tagged as motions to identify, for each motion, at least one of: a motion type and a party filing the motion; and parse, based on the at least one machine learning algorithm, the docket entries tagged as orders to identify, for each order, at least one of: the at least one motion affected by each order, the results-affecting decision of each order, and a name of a decision maker issuing each order.

14. The system of claim 8, wherein the configuration of the motions and orders detector to identify the one or more docket entries correspondingly associated with one or more motions and to identify the one or more docket entries correspondingly associated with one or more orders includes configuration of the motions and orders detector to:

split each of the at least one docket entry into word tokens;

apply the word tokens into a sequence label model to assign a label to each word token of the word tokens;

analyze the labeled word tokens to determine whether at least one of a motion label sequence and an order label sequence is present, the motion label sequence being a sequence of labels that predicts a motion, and the order label sequence being a sequence of labels that predicts an order;

determine that a docket entry that includes the motion label sequence is correspondingly associated with a motion; and determine that a docket entry that includes the order label sequence is correspondingly associated with an order.

15. A computer-based tool including non-transitory computer readable media having stored thereon computer code which, when executed by a processor, causes a computing device to perform operations comprising:

receiving docket data associated with a structured proceeding, the docket data including at least one docket entry;

identifying, by an automated analysis, one or more docket entries of the at least one docket entry correspondingly associated with one or more motions in the structured proceeding;

identifying, by the automated analysis, one or more docket entries of the at least one docket entry correspondingly associated with one or more orders in the structured proceeding, wherein identifying the one or more docket entries correspondingly associated with the one or more orders includes identifying at least one order of the one or more orders that includes a results-affecting decision affecting at least one motion, wherein the identifying the one or more docket entries correspondingly associated with one or more motions and identifying the one or more docket entries correspondingly associated with one or more orders includes:

splitting each of the at least one docket entry into word tokens;

generating at least one feature for each of the word tokens;

applying the at least one feature to a probabilistic context-free grammar parsing (PCFG) algorithm to generate one or more trees for each docket entry of the at least one docket entry, the one or more trees indicating a classification to one of: a motion class and an order class;

computing, based on the at least one feature, a rank for each tree associated with a docket entry of the at least one docket entry; and determining, based on the rank for each tree associated with a docket entry, whether the docket entry is one of: a motion and an order; and generating a dashboard that links, by the automated analysis, the at least one motion to the at least one order, wherein the linking includes providing an indicator including one or more of: a word, a flag, a color code, and a field that indicates the results-affecting decision affecting the at least one motion in association with the affected at least one motion.

* * * * *

UNITED STATES PATENT AND TRADEMARK OFFICE
CERTIFICATE OF CORRECTION

| | |
|---|---|
| PATENT NO. | : 11,475,529 B2 |
| APPLICATION NO. | : 16/446432 |
| DATED | : October 18, 2022 |
| INVENTOR(S) | : Thomas Vacek et al. |

It is certified that error appears in the above-identified patent and that said Letters Patent is hereby corrected as shown below:

In the Specification

At Column 7, Line number 63, delete "tiling party" and replace with --filing party--.
At Column 10, Line number 9, delete "label "C)"" and replace with --label "O"--.

Signed and Sealed this
Thirteenth Day of December, 2022

Katherine Kelly Vidal
*Director of the United States Patent and Trademark Office*